United States Patent [19]
Ellsworth

[11] 3,867,171

[45] Feb. 18, 1975

[54] ADHESIVE COLOR PRINTING SYSTEM FOR FLOOR COVERINGS AND OTHER HOME FURNISHINGS FABRICS

[75] Inventor: Robert Edgewood Ellsworth, Wayne, N.J.

[73] Assignee: American Cyanamid Company, Stamford, Conn.

[22] Filed: Nov. 24, 1972

[21] Appl. No.: 309,032

[52] U.S. Cl....... 117/38, 117/139.5 A, 117/161 KP, 117/161 LN, 260/39
[51] Int. Cl............................................. D06p 1/56
[58] Field of Search........ 117/38, 139.5 A, 139.5 R, 117/161 KP, 161 LN, DIG. 7; 260/29.4 R, 39 P; 8/62, 83, 85

[56] References Cited
UNITED STATES PATENTS

| | | | |
|---|---|---|---|
| 2,523,065 | 9/1950 | Sage | 260/19 |
| 2,863,788 | 12/1958 | Vartanian et al. | 117/33.3 |
| 3,627,719 | 12/1971 | Sellet | 260/29.2 TN |
| 3,640,924 | 2/1972 | Hermann et al. | 260/13 |

FOREIGN PATENTS OR APPLICATIONS

| | | | |
|---|---|---|---|
| 1,001,774 | 8/1965 | Great Britain | 117/161 KP |

*Primary Examiner*—Thomas J. Herbert, Jr.
*Assistant Examiner*—Bruce H. Hess
*Attorney, Agent, or Firm*—H. G. Jackson

[57] ABSTRACT

The invention pertains to compositions comprising a dispersion of a dye or pigment in an aqueous emulsion of a polyurethane adhesive containing a melamine formaldehyde resin and a surfactant, a process for coloring and printing textile materials with the composition, and the materials produced by the process.

8 Claims, No Drawings

ADHESIVE COLOR PRINTING SYSTEM FOR FLOOR COVERINGS AND OTHER HOME FURNISHINGS FABRICS

SUMMARY OF THE INVENTION

The invention comprises a composition containing a colorant dispersed in an aqueous polyurethane adhesive containing an aminoplast resin and processing aids and the process for applying the compositions to textile materials, particularly needle-punched non-woven carpeting, to obtain a colored or printed substrate having marked resistance to crocking, excellent sharpness and excellent washfastness without employing steaming and aging steps required in conventional processes.

BACKGROUND OF THE INVENTION

1. Field of the Invention

The invention pertains to adhesive compositions for color printing textile materials, to coloring and printing processes using these compositions, and to the textile materials as colored or printed.

2. Description of the Prior Art

The prior art processes for pigment-printing textiles utilize a series of operations in which the textile material is printed with an emulsified dispersion of a pigment containing a resin either natural or synthetic, or with a cellulose ester, heating, steaming, rinsing, washing, vacuum extracting and drying the treated material. The printing of carpet materials with colorant pastes by means of such a multi-step process is becoming more popular particularly in the needle-punched tufted carpet style. However, the application of colorants under these conditions to carpeting materials is costly and the finished product often has deficiencies such as lack of sharpness in the print, poor hand, poor resistance to crocking and poor durability to laundering.

DESCRIPTION OF THE PREFERRED EMBODIMENTS

I have discovered a composition and a process for coloring and printing textile materials therewith, particularly non-cellulosic materials, which is an improvement over the previously known processes.

In accordance with this invention, the textile material to be printed may be fibers, yarns, woven, non-woven, knitted, tufted, looped or needle-punched fabrics, either backed or unbacked. The materials used may either be natural or synthetic fibers including cotton, rayon, wool, silk, polyester, polyamide, cellulose acetate, acrylic, polyethylene, polypropylene, poly(vinylacetate), poly(vinylchloride), polyurethane and blends thereof.

Some uses for the process of this invention are the stabilization and tinting of needle-punched polypropylene carpet scrim, and the space-printing of nylon carpet yarn. Non-woven polyester interlinings and nylon battings can also be stabilized and printed by this process.

The aqueous adhesive-pigment dispersion of this invention is a composition of a pigment in a particular class of self-dispersible or emulsifiable polyurethane polymers as described in U.S. Pat. No. 3,640,924 (1972), and in co-pending U.S. patent applications, Ser. Nos. 275,392 filed July 26, 1972; 184,609 filed Sept. 28, 1971; 184,610 filed Sept. 28, 1971 and 275,393 filed July 26, 1972. The adhesive composition useful in the invention is an aqueous dispersion of a particular class of self-dispersible or emulsifiable polyurethane polymers. The aqueous dispersions are obtained by adding a particular class of isocyanate-terminated polyurethane prepolymers having pendant carboxyl groups to water containing a tertiary aliphatic amine and allowing chain extension with water to proceed until all of the isocyanate groups have been reacted. The resulting polyurethane latex is thickened to the desirable viscosity with suitable thickening agents.

The isocyanate-terminated polyurethane prepolymers having pendant carboxyl groups are prepared by reacting an organic diisocyanate with a molecular deficiency of a mixture of two types of glycol.

The first type of glycol is a non-polymeric glycol containing a pendant carboxyl group and the second type is a conventional polyalkylene ether glycol, or mixtures of such polyalkylene ether glycols.

The organic diisocyanate is an aromatic diisocyanate having the isocyanate groups directly attached to the aromatic ring, such as the tolylene diisocyanates, including 2,4- and 2,6-tolylene diisocyanate and mixtures thereof; methylenebis (4-phenyl isocyanate); p-phenylene diisocyanate; 1,5-naphthylene diisocyanate, and the like. The diisocyanates may contain other substituent groups, such as halo, although those free of such groups are preferred.

The nonpolymeric glycol containing a pendant carboxyl group has the formula:

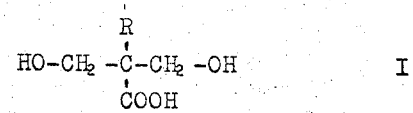

where R is hydrogen or a hydrocarbon radical, preferably lower alkyl (1-3 carbon atoms). The glycols of Formula I are for example 2,2-bis(hydroxymethyl)lower alkanoic acids and they include 2,2-bis(hydroxymethyl)acetic acid, 2,2-bis(hydroxymethyl)propionic, 2,2-bis(hydroxymethyl)butyric acid, and 2,2-bis(hydroxymethyl)valeric acid. The preferred glycol is 2,2-bis(hydroxymethyl)propionic acid.

The polyalkylene ether glycol has the formula:

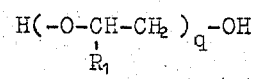

wherein $R_1$ is lower alkyl and $q$ is an integer sufficiently large to provide an average molecular weight for the glycol of at least 750, and up to 5,000, with a preferred average molecular weight range of about 1,700 to about 2,400. Representative glycols include polyethylene ether glycol, poly-1,2-propylene ether glycol, poly-1,2-butylene ether glycol, etc.

In preparing the prepolymer, at least 1.1 moles and up to about 5.0 moles (preferably between 1.6 and 3.0 moles) of the diisocyanate per mole of total glycol should be used. The molar ratio of nonpolymeric glycol containing a pendant carboxyl group to the polyalkylene ether glycol should be between about 0.25:1 to 2:1, preferably between 0.75:1 and 1.25:1. The temperature used for the reaction between diisocyanate and glycols should be between about 50° and 80°C.

The amount of water used with the prepolymer in forming the water-extended polyurethane latex is not critical. Latices of solids content from about 10 percent up to about 60 percent can be obtained, although a solids content of 25–50 percent is preferred. Formation of the latex at room temperature is convenient and practical, although higher or lower temperatures may be used.

The tertiary amine present in the water during the latex formation is a tertiary lower alkylamine including trimethylamine, triethylamine and tripropylamine, for example, preferably triethylamine. The amount of tertiary amine used should be between 2 and 10 percent, preferably between 3 and 7 percent, based on weight of prepolymer.

In this invention it is critical to add a thermo-setting aminoplast precondensate, such as melamine-formaldehyde, urea, or cyclicurea-formaldehyde condensates to the adhesive to improve the solvent resistance or crockfastness of the adhesive. The preferred aminoplast precondensates are melamine-formaldehyde condensates, including alkyl ethers thereof, which contain at least two or more methylol, or alkylated methylol groups, per molecule of aminoplast compound.

Representative melamine compounds include dimethylol melamine, dimethylated trimethylol melamine, hexakis(methoxymethyl)melamine, partially methylolated pentamethylol melamines, etc. Representative urea and cyclic urea compounds include dimethylol urea, polymethylol urea, methylated dimethylol urea, dimethylol ethylene urea, and the like. Combinations of the above methylolated aminoplast compounds may also be used.

The pigments used in textile printing are of a wide variety and include both organic and inorganic colored and daylight fluorescent pigments.

The fundamental adhesive composition of this invention can be modified by incorporating therein various soluble or dispersible agents which further improve the hand characteristic of the treated material, or which facilitate the application. For instance, the adhesive-pigment compositions can also contain minor amounts (e.g., from 2.0 to 5.0 percent by weight of the total solids content) of such hand modifying agents as silicones and the like.

The methods for preparing the dispersion or emulsion of the pigment in the adhesive are conventional and any of the well-known procedures may be used. The usual method employed is to combine the urethane latex with a small amount of melamine or urea-formaldehyde resin, a suitable catalyst to cure the resin, a surfactant, a silicone emulsion and an alcohol. The pigment is then dispersed thoroughly in a small amount of water and added to the mixture without entrapment of air. The final composition contains about forty parts of polyurethane per hundred parts by weight, more or less, depending on the end-use requirements.

A typical final latex of the invention comprises by weight between about 30 and 50 percent polyurethane solids, between about 2 and 5 percent solids of methylated melamine formaldehyde resin, between about 0.2 and 0.5 percent solids of surfactant and between about 2 and 5 percent solids of hand modifying agent.

The emulsion obtained produces clean, sharp, colored prints either when printed alone or in multicolored patterns with similar emulsions or in combinations with certain dye components.

The application to the substrate is by conventional knife coating, padding, spraying, and printing by either plain, gravure, transfer roll, or screen, and other coating methods. Application methods are discussed in Chapter 2 of Printing Ink Manual published by W. Heffer & Sons, Ltd., Cambridge, England, 2nd Ed. 1969. See also American Dyestuff Reporter, June 1972, pages 40–42. The treated substrate is then dried by standing at room temperature, or by heating between 225° and 350°F., preferably between 275° and 325°F. to obtain good prints. The finished carpeting has wet and dry crockfastness ratings in the class of 4–5 according to AATCC Standard Test Method 8–1961.

Proper viscosity of the adhesive is important in order to prevent undue penetration of the adhesive into the substrate to which it is applied. In other words, the bulk of the adhesive should reamin on the surface of the substrate to provide good adhesion. Viscosities of the order of 900 to 150,000 cps are normally satisfactory. Suitable thickening agents are included in the adhesive to obtain the desired viscosity. A preferred viscosity range is from 60,000 to 95,000 cps.

The addition of silicone to the mixture eliminates stickiness of hand of the finished material.

The pigment-adhesive composition is sufficiently viscous to prevent penetration into the fiber or fabric. The coating is flexible, even when fully dried, and does not become brittle on aging. Although many of the textile adhesive compositions currently used employ an organic solvent base, aqueous base adhesives are more desirable since (1) they can be diluted with water for cleaning purposes, (2) they do not present fire or explosion hazards, and (3) they have little odor and are non-toxic.

The adhesive pigment composition of this invention forms strong bonds with the textile material and provides a finished product having (1) dimensional stability to washing, dry-cleaning, and pressing, (2) durability of the bond between the textile material and the pigment to washing, drycleaning, pressing and peeling, and (3) satisfactory handle and drape characteristics.

Proper viscosity of the adhesive is important to prevent undue penetration of the adhesive into the substrate. In other words, the bulk of the adhesive should remain on the surface of the substrate to provide good adhesion. Viscosities in the order of 80,000 to 95,000 cps. are preferred. Suitable thickening agents include methyl cellulose, hydroxylethyl cellulose, polyacrylic emulsions plus alkali, and the like.

The adhesives of this invention can be used with any substrates normally used in color printing processes including woven and non-woven fabrics of natural and synthetic fibers, paper, plastic coated fabrics, plastic films and sheets, wood, metal, rubber, glass, etc.

For most purposes, a dry adhesive film or layer of from about 1 mil to 20 mils, preferably 4 mils to 8 mils, in thickness is satisfactory, although greater or lesser thicknesses may be used if desired.

The following examples illustrate the invention in more detail but are not to be construed as limitative.

EXAMPLE 1

An amount of 2.0 parts of Calcotone Black 37 paste (Color Index 77266) was added to 1.7 parts of warm water (80°F.) and stirred at 80°F. until a homogeneous dispersion was obtained. To this dispersion was added an emulsion containing 90 parts of a 40 percent solids polyurethane adhesive, 2.0 parts of a methylated hexamethylol melamine resin having about 5 of the methylol groups methylated, 4.0 parts of a silicone emulsion, containing 40 percent by weight of a polysiloxane and 2 percent of a polyvinyl alcohol, 0.2 part by weight of a 30 percent aqueous solution of mixed isopropanolamine hydrochlorides and 0.1 part of a solution of an anionic sufactant which is a 25 percent aqueous solution of sodium bis(2-ethylhexyl)sulfosuccinate, and the resulting mixture was stirred until a uniformly black emulsion was obtained. The black-colored emulsion thus obtained was screen printed on pieces of carpeting using 4 passes with a rubber squeegee. The printed carpeting was dried 1 minute in forced air ovens at 275° and 325°F., withdrawn and held 30 seconds outside the oven, then returned to the same oven and cured for different periods of time. The colorfastnesses to crocking were then determined. Considerable improvement in wet crocking, from a 1 to a 5 rating, was obtained by a longer total time (5 min.) at 275°, or a shorter time at 325°F. The dry crock rating was 4 in all cases. The results are shown in Table 1.

TABLE 1

| Carpet | Drying and Curing Conditions | Crock Rating Wet | Dry |
|---|---|---|---|
| A | Dry 1 min. at 275°F., 30 sec. in air, 2 min. at 275°F. | 1 | 4 |
| B | Dry 1 min. at 275°F., 30 sec. in air, 3 min. at 275°F. | 1–2 | 4 |
| C | Dry 1 min. at 275°F., 30 sec. in air, 4 min. at 275°F. | 5– | 4 |
| D | Dry 1 min. at 325°F., 30 sec. in air, 2 min. at 325°F. | 2 | 4 |
| E | Dry 1 min. at 325°F., 30 sec. in air, 3 min. at 325°F. | 4–5 | 4 |

EXAMPLE 2

Amounts of 4.0 parts of Calcotone Blue GPN Paste (C.I. 74160) and 0.31 part of Calcotone Yellow GP Paste (C.I. 21095) were added to 2.0 parts of warm water (70°F.) and stirred at 70°F. until a homogeneous dispersion was obtained. This dispersion was then mixed with an emulsion containing 100 parts of a polyurethane adhesive (40 percent solids), 1.25 parts of a methylated hexamethylolated melamine resin having about 5 of the methylol groups methylated, 2 parts of a silicone emulsion containing 40 percent by weight of a polysiloxane and 2 percent of a polyvinyl alcohol, 0.11 part of a 30 percent aqueous solution of mixed isopropanolamine hydrochlorides and 0.1 part of an anionic surfactant which is a 25 percent aqueous solution of sodium bis(2-ethylhexyl)sulfosuccinate, and the entire mixture was stirred until a uniformly pigmented emulsion was obtained.

The blue-colored emulsion thus obtained was screen printed on carpeting using 4 passes with a wooden squeegee, and the prints dried 1 minute at 170°F. and cured for 2 minutes at 275°F. in a forced hot air oven. This process produced a blue shade on the carpeting which had a 5 rating on both wet and dry crocking tests and good wash fastness. The patterns obtained were very sharp and the flexibility of final prints was good.

I claim:
1. A process for coloring textile substrate materials of carpeting, yarns, interlinings and battings of natural and synthetic fibers comprising:
   dispersing a pigment in an aqueous dispersion of self-dispersible or emulsifiable polyurethane polymer adhesive containing an aminoplast resin of melamine-formaldehyde, urea, or cyclicurea-formaldehyde condensates and a catalyst for curing the aminoplast resin wherein the polyurethane polymer is obtained by adding an isocyanate-terminated polyurethane prepolymer having pendant carboxyl groups to water containing a tertiary aliphatic amine and allowing chain extension to proceed until all the isocyanate groups have been reacted,
   applying the dispersion to the textile substrate, and drying the treated substrate.

2. A process according to claim 1 wherein the adhesive comprises a polyurethane latex having a viscosity between 60,000 and 95,000 cps and the aminoplast resin is a methylated melamine formaldehyde resin with the additional elements of
   adding an anionic surfactant and a hand modifying agent to the dispersion and
   drying the treated substrate at a temperature ranging from about 225° to about 350° F. for a period ranging between about 0.5 to about 6.0 minutes.

3. A process according to claim 2 wherein the polyurethane solids comprise between about 30.0 and 50.0 percent, the solids of methylated melamine formaldehyde resin comprise between about 2.0 and 5.0 percent, the solids of surfactant comprise between about 0.2 and 0.5 percent and the solids of hand modifying agent comprise between about 2.0 and 5.0 percent by weight of the final latex.

4. A process of claim 3 wherein the methylated melamine formaldehyde resin contains approximately 5 methylated methylol groups per molecule, the surfactant is a anionic surfactant, the hand modifying agent is a polysiloxane, and the treated textile material is dried between 275° and 325° F. for 2 to 5 minutes.

5. A process according to claim 4 wherein the coloring of the textile substrate is accomplished by printing.

6. A process according to claim 5 wherein the printed textile material is carpeting.

7. A process according to claim 6 wherein the carpeting comprises non-woven synthetic material.

8. The products according to the process of claim 1 on textile substrates.

* * * * *